Patented May 31, 1938

2,119,189

UNITED STATES PATENT OFFICE 2,119,189

PIGMENT AND PROCESS OF MAKING THE SAME

Gustave Widmer, Philadelphia, Pa., assignor to the firm of Society of Chemical Industry in Basle, Basel, Switzerland No Drawing. Application March 27, 1933, Serial No. 663,097

8 Claims. (Cl. 134—58)

In the copending U. S. specification Serial Number 656,024, Patent No. 2,093,651, dated Sept. 21, 1937, it is disclosed, that carbamide-formaldehyde products, especially in the heat-treated insoluble form, have a decided affinity for soluble organic dyes, particularly for acid wool and silk dyes, so that these dyes can be chemically affixed to cotton in presence of such carbamide-formaldehyde products. It has also been disclosed, that insoluble dyes, lakes and pigments can be mechanically affixed to fibrous products by heat-treating a fibrous material, impregnated or printed, with a suspension of a pigment with a carbamide-formaldehyde product. It is further known, that basic dyes can be used for dyeing cotton, using tannic acid as a mordant in presence of urea or thiourea products.

It has been found, that in these cases the fibre acts only as a mechanical support, and that in, on and around the fibres there is deposited an insoluble carbamide-formaldehyde product, which actually contains the color mechanically or chemically affixed, whereas the cellulosic fibre remains practically undyed. Under the microscope one can easily see, that in, and/or around the fibre is the colored compound of dyestuff with the carbamide-formaldehyde product, the cellulosic fibre itself being practically water-white.

Methods were therefore developed to produce this colored, insoluble compound consisting of dyeing matter and the heat-treated carbamide-formaldehyde product in a pure form. Such a pure product has the properties of a color-pigment or lake and can be used as coloring matter for making paints, varnishes, linoleums, etc., for producing printing pastes, used in the graphic industry, for manufacturing textile prints, paper prints, wall paper and many other uses.

It was found that the production of these new pigments is carried out advantageously according to the three following methods, which methods also may be used in combination.

*I. Method.*—The coloring matter is dissolved or suspended in a solution of the desired carbamide-formaldehyde product, which, by further reaction in presence of a diluent, is transformed into the insoluble phase. This insoluble product, absorbs or envelops the color in the solution and precipitates it in form of a colored fluffy or curd-like deposit, which is filtered, washed and dried. This method is very well suitable for both, soluble dyes and insoluble coloring matter.

*II. Method.*—The coloring matter is dissolved or suspended in a solution of the desired carbamide-formaldehyde product, brought to dryness and heat-treated to transform it into the insoluble stage. During this process the color material is either chemically absorbed or mechanically enveloped. The heat-treated colored material is then ground into a very fine powder. This method is well suitable for both, soluble dyes and insoluble coloring matter.

*III. Method.*—The carbamide-formaldehyde product is first heat-treated to make it insoluble and then finely powdered. The dyestuff is then dissolved e. g., in water and then the heat-treated powdered carbamide-formaldehyde product dispersed therein. The dye is then absorbed and the colored powder is filtered off, dried and powdered. A subsequent heat-treatment is sometimes advantageous. This method is applicable particularly for soluble dyestuffs.

The variety of the modern dyestuffs, soluble and insoluble, and other coloring matter is so great and their properties, due to their chemical constitution so different, that it is impossible to prepare good pigments from all of them according to a single standard method. The aforementioned methods however can be used successfully with most of the dyestuffs and practically all insoluble coloring matters. Other dyestuffs again can be turned successfully into good pigments by combining the above-mentioned new methods with other well known methods used to produce pigments from dyestuffs. The use of mordants, absorbent sub-trata-like aluminum hydroxide, green earth, china clay, etc., metal salts (to produce insoluble dyestuffs salts) and similar substances, which are commonly used for making pigments, in combination with the new processes was found to be feasible. Plain white fillers, like barium sulfate, calcium sulfate, zinc oxide, zinc sulfide, titanium dioxide, etc, may also be incorporated to increase the opacity of the pigment.

Water insoluble dyes lend themselves very readily to the manufacture of pigments on the base of carbamide-formaldehyde product. They are particularly interesting, because of their light-fastness, which is in general good or even excellent (alizarine derivatives, Cibanone dyes, Indanthrenes, etc.). This light-fastness is splendidly retained by combining such dyes with carbamide-formaldehyde products or even improved due to better exclusion of air from the dyestuff particles. Many of these water insoluble dyes produce pigments according to the known methods which are light-fast too, but not fast to oil, especially azo dyes, which bleed badly in oil.

Combined with carbamide-formaldehyde products they usually can be improved more or less, because the dyestuff grains are for the greatest part enveloped with the carbamide-formaldehyde products which in turn are perfectly insoluble in oil.

In the same manner inorganic colors can be made into pigments. Ultramarine, titanium dioxide, lithopone, carbon-blacks can be combined with carbamide-formaldehyde products. The best results are here obtained with Methods I and II.

Acid dyes have a particular affinity to heat-treated carbamide-formaldehyde products, as disclosed in the copending specification Ser. No. 656,024. In many cases the affinity is so great, that a simple shaking of a dyestuff solution with some powder of a heat-treated carbamide-formaldehyde product absorbs the dyestuff, nearly exhausting the solution and falling as a full colored deposit (e. g., clothfast orange G). Usually the water resistance of a pigment made from such dyes is good.

In other cases however the affinity is not so great, and only a part of the dye is absorbed. In order to obtain also in such cases nonbleeding good pigments, a longer reaction is necessary, up to many hours.

In some cases it is necessary to combine one of these new methods with one of the well known older methods. Water-insoluble metal salts may be formed at the same time or subsequent to the combination with the carbamide-formaldehyde product. Good results also can be secured sometimes by adding aluminum hydroxide to assist the absorption of the dye, if desired in presence of bariumsulfate.

Acid dyes of the resorcinol type, like eosine, which show not a very good affinity to carbamide-formaldehyde products in their neutral state, have been found to fall very completely in slightly acidified solution.

Also acid dyes with basic groups like e. g., alizarine sapphire blue C. G. have been found to be very well absorbed by these new processes.

Basic dyes in general also show an affinity for carbamide-formaldehyde products, though in general more care is demanded to produce good nonbleeding pigments. Sometimes varying the reaction conditions helps remarkably, e. g. reacting in acid solution and cooling in neutral or basic solution. Basic colors usually require a longer time for the absorption of the dye.

Good results can be secured in this group also using Method II in conjunction with old methods using tannic acid, tartar emetic, china clay, rosin and the like. Pigments obtained in this way usually have a good water resistance and are more brilliant than the pigments made with the old methods alone.

The chemical composition of the carbamide-formaldehyde products may be very different. In the place of urea, other carbamides, urea derivatives or homologues of urea can be reacted with formaldehyde or its polymers. The formaldehyde products of thiourea, guanidine, biuret, dicyandiamide, phenylurea, diphenyl-guanidine etc. have been successfully used. Even the formaldehyde product of cyanuric acid has been found to be operative. Commercially very interesting are in particular combinations of urea-formaldehyde products with other carbamide-formaldehyde products.

All reaction phases of these carbamide-formaldehyde products are applicable to produce pigments according to this invention: The water-soluble, water-insoluble, jellylike and solid phases. Early reaction phases are particularly suitable for Methods I and II. For water-soluble dyes mere mixes of the carbamides and the formaldehyde, their methylol compounds or water-soluble resins are most advantageously used, whereas for inorganic or organic insoluble colored substances more viscous phases are better suited. For Method III all phases may be used after a suitable heat-treatment, and even left over or partially cured material, which went to waste, in other applications of carbamide-formaldehyde products (old molding powders, molding waste etc.) can advantageously be used for this method after suitable processing by heat treatment, grinding etc.

The heat treatment has to be carefully done to secure best results. According to the chemical composition of the carbamide-formaldehyde product the time and temperature of the heat treatment may vary considerably. Temperatures of 70° C. up to about 160° C. have been found to give good results, a particularly favored range being 130–140° C. Over 160° C. most of the products char and at temperatures under 70° C. it is hard to obtain pigments of good water resistance.

The pigments obtained according to the invention are characterized by their brilliance and strength. Due to the perfectly water-white base the brilliancy of the new pigments is in most cases superior to pigments made according to old method, particularly when in these old methods more or less colored substratas are used like green earth, china clay, rosin, tannic acid etc. For these same reasons the purity of the color shade is remarkable.

In regard to the strength one is far more at liberty to produce the fuller and stronger shades than with the old methods. While the most concentrated green earth pigments contain about 11% dye, the new pigments can without difficulty be prepared up to 25% dye content and higher if desirable.

The new pigments on pure carbamide-formaldehyde base have a density of about 1.4 as against 2.8 for green earth, 2.4 for aluminum hydroxide, and 4.4 for bariumsulfate. Due to this low density they do not so easily settle when used in paints or similar applications.

The light resistance of the new pigments is greatly dependent on the type of coloring matter used for their manufacture. By testing a great number of these pigments it was found, that their light fastness is about the same as the light fastness of the original coloring matter. In a few cases the light fastness was found to be decreased but in many other cases a remarkable improvement of the light fastness was noted, e. g., with clothfast orange G.

The new pigments show also a notable transparency, when used in oil, as it is desirable e. g., for preparations for the graphic industry. If there is more opacity required, white substratas or white pigments may be incorporated during the process of production.

The new pigments are destroyed by the action of concentrated alkalies or acids. They are very stable however in media, which are slightly acid or slightly basic, provided the coloring matter used stands up also.

The new pigments are insoluble in water, alcohol and other common solvents, like benzol, esters etc., and may therefore be used in practically all commercial preparations using pigments.

By the term "carbamide" as used herein is meant not only urea, the simplest carbamide, but also homologues and derivatives of urea, as disclosed in the examples and description.

The term "formaldehyde" as used herein covers also its polymers, which, under the conditions of the reactions disclosed, produce the same results as monomer formaldehyde.

*Example 1.*—A carbamide-formaldehyde product of a medium condensation phase is prepared as follows:

600 parts of urea are dissolved in 1620 parts of (37% wgt.) formaldehyde, about 80 g. Norite S. Q. A. (an active filter carbon) suspended in the solution and the mix filtered. The water clear solution has a pH value of about 7.0 and is then heated in a closed vessel to 100° C. for 8 hours. The slightly viscous, water clear liquid can easily be diluted with 1 to 3 volumes of water, but becomes turbid on further dilution.

7.5 parts of finely powdered thiourea are dissolved in 100 parts of the above solution at a moderate temperature and the product is now ready for use. (Varnish I.)

*a.* 2 g. clothfast violet R are dissolved in 500 cc. water of about 80° C., and, while well stirring, 100 g. of varnish I are added thereto. Then 5 cc. concentrated hydrochloric acid diluted in 20 cc. water, are mixed into the solution. After a few minutes, deposition of the urea resin sets in, and the mixture is well stirred while the temperature is kept at about 80° C. The dye is rapidly absorbed by the soft curd-like deposit, and after the dye-bath is nearly exhausted, the mix is cooled while still stirring. The deposit is then filtered off on a Buchner suction funnel, whereby a perfectly color-free filtrate is obtained, washed with plenty of water to remove salts, and finally dried over night at about 80° C. About 22 g. of a full shade violet pigment are obtained, containing about 9.1% of the dyestuff. This pigment is very easily powdered and does not bleed in water.

*b.* 2 g. of alizarine fast green C. G. (Ex. conc. CIBA) are dissolved in 500 cc. water and deposited with varnish I analogous as in Example 1a. Exhaustion of the dye is complete also here in ½ hour and 28.5 g. of a full green pigment are obtained (about 7% dye) which does not bleed a trace in water and possesses a splendid lightfastness.

*c.* A pigment with as deep a shade as a pure color or dye is prepared with 6 g. alizarine fast green C. G. according to 1b. Also here the reaction of dye and varnish in acid solution exhausts the bath completely and a water clear filtrate results. 23.5 g. of an almost blackish green pigment are produced, containing 25.5% dye. It does not bleed in water and has a very good lightfastness.

*d.* 4 g. disperso carbon black are wetted with 10 cc. alcohol and then suspended in 400 cc. water of 80° C. Then 100 g. of varnish I are stirred into it and afterwards 5 cc. concentrated hydrochloric acid which is diluted with 20 cc. water, are also mixed into it. The curd-like deposit pulls down the black color completely and after filtering, washing and drying 24 g. of a grey-black pigment are obtained, containing about 16.7% disperso carbon black.

*e.* A pigment is prepared from 2 g. malachite green, cryst., which dye does not come down quite so easily as the previous soluble dyes. After reacting varnish I and dye in acid solution according to 1a for ½ hour there is still a substantial amount of dye in solution. The solution is therefore made slightly basic by adding ammonia, and then 2 g. tannic acid in form of a 10% solution are stirred into it, and, after a few minutes, 1 g. of tartar emetic which is dissolved in 20 cc. water added. The filtrate of the deposit is now perfectly water-white. After well washing with plenty of water and subsequent drying, a deep green pigment is obtained (30 g.) containing about 6.7% dye. The lightfastness of this pigment is markedly better as compared with the original soluble dye.

*f.* A malachite green-pigment on pure carbamide-formaldehyde resin base without the use of depositing agents like tannic acid or the like can be produced as follows:—

2 g. of the dye are dissolved in 400 cc. water at boiling temperature. Under continuous, efficient stirring, 100 g. varnish I and 20 cc. 10% hydrochloric acid are added. After ½ hour, while the mix is gradually cooled down, it is slightly over neutralized with sodium carbonate solution of 10% strength. The supernatant liquor is almost water-white, and the deposit is worked up as mentioned in the previous examples. The pigment obtained is a very brilliant green and does not bleed in water.

*g.* In the same manner as Example 1a 2 g. kiton pure blue A are made into a pigment with varnish I in acid solution. This dyestuff is well known for its difficulty to be made into a pigment according to the old methods. With remarkable ease a nonbleeding pigment of outstanding brilliancy is produced from this dye.

*h.* A pigment of excellent brilliancy and strength is prepared from 2 g. saffranine Y according to Example 1a. However the reaction at 80° C. has to be continued for about 4 hours, after which time, upon cooling, the exhaustion of the dye bath is almost complete. The deposit is filtered, well washed, dried at 80° C. over night and powdered. 43.5 g. of a deep blue-red pigment are produced, containing about 4.6% dye.

*i.* 2 g. chrysoidine Y are dissolved in 400 cc. of boiling water. While stirring 100 g. varnish I are added thereto and then 20 cc. hydrochloric acid of 10% strength. It is stirred for ½ hour while the mix is gradually cooling. Then it is made slightly alkaline by the addition of sodium carbonate solution and stirred for ½ hour longer. The liquid is still rather deep colored and 3 g. china clay are added for further absorption of the dye, stirring for another half hour. The dye solution is now fairly well exhausted and the deposit is filtered off, washed and dried over night. The resultant pigment is a medium orange and does not bleed in water.

*Example 2.*—600 g. urea are heated in a round flask for 17 hours to 160 to 165° C. in an oil bath. The fused material has now changed from a clear, nonviscous liquid to a white grainy magma and is poured out on a metal tray to cool. The hard, white, crystalline product so obtained with a yield of about 87% contains the products of reaction from urea, substantially due to loss of ammonia. Unreacted urea, biuret, cyanuricacid, guanidine, have been isolated from this heat-treated urea, which is therefore an important source for urea derivatives.

140 g. of this heat-treated urea are dissolved in 360 cc. formaldehyde (of 39% vol.) by stirring the mix on the boiling water bath. In a few minutes a clear slightly yellowish solution is formed of distinctly acid reaction. 10 g. Norite S. Q. A. (an active filter carbon) are added and the mix filtered through a Buchner funnel. A crystal clear solution of a pH value about 6.0 results. This product is concentrated in a good vacuum at about 60° C. and a thick clear syrup is obtained, perfectly clear and soluble in cold water. The syrup contains about 80% solid carbamide-formaldehyde products. (Varnish II.)

a. 2 g. neolan blue 2G are dissolved in 500 cc. water and 50 g. varnish II and 20 cc. of 10% hydrochloric acid are added. The solution is then kept at about 80° C. After about 10 minutes a deposit begins to appear, taking down the main part of the dyestuff. After one hour reaction at 80° C. the absorption of the dye is still very incomplete and the mix is left standing in the warm water-bath over night. Perfect exhaustion is now effected, the filtrate being water-white. The deep blue deposit is dried over night at 80° C. and 17.5 g. pigment of 11.5% dyestuff content obtained. This pigment does not show a trace of bleeding in water and shows a splendid light fastness.

b. 2 g. eosine Y dissolved in 500 cc. water are reacted at 80° C. for 3 hours with 50 g. varnish II in presence of 20 cc. hydrochloric acid (10%) similarly as Example 2a. The reaction is completed by standing in the warm water-bath over night. The supernatant liquid is now perfectly exhausted and not a trace of color is observed in the filtrate upon filtering on a Buchner funnel. The filter cake is well washed and dried at 80° C. over night. 20 g. of a brilliant red colored pigment are obtained which bleeds just a trace in water.

Example 3.—Varnish I (Example 1) is evaporated to dryness and heat-treated for 4 hours at 130° C. in order to make it insoluble. The product is then finely ground in a ball mill. (Powder I.)

a. 2 g. clothfast orange G (conc. CIBA) are dissolved in 600 cc. water and reacted for ½ hour at about 60° C. with 8 g. powder I, which is kept suspended in the dye solution by continuous stirring. Then it is cooled while stirring and 50 cc. concentrated sodium sulfate solution added and then filtered. The filtrate is of a very light yellow color, indicating almost complete extraction of the dye. The residue is washed, dried, powdered and constitutes a very brilliant colored deep orange pigment, not bleeding in water. The light fastness of this pigment is remarkable in comparison to the original soluble dye. A rubout in glue does not show a trace of fading after 10 hours' exposure to artificial daylight in the Atlas Fadeometer, whereas a paper, colored with the original soluble dye to the same shade is almost completely bleached out after the same light exposure.

b. 2 g. malachite green, cryst., are dissolved in 500 cc. hot water. 30 g. powder I are kept suspended in the dye solution for 15 minutes at about 80° C. and then the mix is cooled. 2 g. tannic acid, dissolved in 20 cc. water are added while stirring, and then 1 g. tartar emetic, dissolved in 20 cc. hot water added. The mix is then made distinctly alkaline with ammonia and filtered. The filtrate is a very light blue and the deposit is sand-like, dense and deep darkgreen colored. 31 g. pigment of about 6.5% dye content are obtained after washing and drying. The light fastness of this pigment is markedly better as compared with the original soluble dye.

c. 2 g. malachite green, crystals, are dissolved in 500 cc. water and 50 g. varnish II dissolved therein, 20 cc. of 10% hydrochloric acid are then added and the solution reacted at about 80° C. for ½ hour. The deposit formed takes down a part of the dye. 20 g. of powder I are now suspended in the mix and reacted for 1½ hours, then slowly cooled over night. The supernatant liquid still shows a deep green color and its reaction is now brought to neutral by adding 20 cc. 10% sodium carbonate solution. Deposition of the dyestuff is completed by adding 100 cc. rosin-soap solution, prepared by dissolving 4 g. clear colored rosin and 2 g. sodium carbonate. Immediately the solution clears up considerable and the filtrate is only very light green colored upon filtering. The deposit is washed and dried over night at about 80° C. The dark green pigment thus obtained does not bleed in water and shows a decided improvement in light fastness compared with the original soluble dye.

d. 1 g. scarlet 2R is dissolved in 400 cc. water and 10 g. powder I suspended therein by stirring at about 80° C. After about ½ hour, 10 g. aluminum sulfate dissolved in 100 cc. water are added, and then the aluminum hydroxide deposited by addition of 5 g. sodium carbonate in 50 cc. water. The solution is still very deep colored, and the deposition of the dye is completed by adding 12 g. barium chloride, dissolved in 150 cc. water. The supernatant solution is now almost water-white and the deposit is filtered off, well washed and dried at 80° C. over night. This pigment is of good brilliancy and of good water resistance.

The conventional type of lake is prepared in comparison to this example as follows: 10 g. of alum are dissolved in 100 cc. water and 5 g. of soda ash, dissolved in 50 cc. water are added and the mix heated to 60° C. 1 g. of scarlet 2R is dissolved in 100 cc. water and added to the mix above. Precipitation is effected by adding 15 g. barium chloride dissolved in 150 cc. water. The pigment comes down well and is filtered, washed and dried.

The completed rubout and light test of these two pigments display the following characteristics: The pigment, containing carbamide-formaldehyde product is much brighter than the pigment made according to the old method. Also the light fastness of the new pigment shows a considerable improvement.

Example 4.—a. 5 g. neolanbordeau are dissolved in 50 g. varnish I and 50 g. alcohol. This solution is baked for 4 hours at 130° C. in an electric oven and the foamy hard mass powdered in a ball mill. About 25 g. of a deep Bordeau red colored pigment powder are obtained which shows just a trace of bleeding in water and has an excellent light fastness.

b. In an exactly analogous manner 5 g. clothfast orange G (conc. CIBA) are baked with 50 g. varnish I and a deep, brilliant orange red pigment produced of splendid light fastness. The yield is about as in Example 4a and the pigment does not bleed in water.

c. 15 g. indanthrene blue GGSL are finely suspended in 300 g. varnish I by grinding in a ball mill over night. Then the suspension is heat-treated for 4 hours at 130° C. A very brilliant pigment is obtained of a pure deep blue color, whereas the original color is more on the reddish side and is duller in shade. The resistance against light and water is excellent.

Example 5.—In 50 g. of varnish II, 2 g. of scarlet 2R are dissolved and the solution baked for 4 hours at 130° C. A pigment of excellent brilliancy is obtained after grinding, which, although it bleeds a little in water possesses excellent light fastness considerably improved over the original, soluble dye.

*Example 6.*—a. 50 g. dimethylol urea are dissolved in 100 cc. water and then 4 g. kiton fast yellow 3G added thereto. After complete solution a heat-treatment of 4 hour at 130° C. is applied and the foamy hard mass powdered in a ball mill. A deep yellow pigment of excellent light fastness is produced, which does not bleed a trace in water.

b. 40 g. dimethylol urea and 10 g. dimethylolthiourea are dissolved in 100 cc. water and 4 g. kiton fast yellow 3G added. After 4 hours baking at 130° C. a pigment powder is obtained as in Example 6a. The pigment is a very brilliant yellow, which, although it bleeds in water, shows a splendid light resistance.

c. A carbamide-formaldehyde product is prepared from dicyandiamide as follows: 16.7 g. of dicyandiamide are dissolved in 33.3 g. of formaldehyde by heating on a boiling water-bath for 10 minutes and subsequently cooling of the perfectly clear solution. 4 g. of kiton fast yellow 3G are dissolved in this solution. The product is then baked 4 hours at 130° C. and the foamy mass finely ground in the ball mill. The brilliant yellow pigment so obtained bleeds somewhat in water, but possesses a splendid light fastness.

*Example 7.*—A formaldehyde product of cyanuric acid is prepared as follows: 12 g. of cyanuric acid are refluxed for 2 hours with 32.5 cc. of formaldehyde (37% wgt.). The resultant solution shows a milky turbidity and is therefore filtered, and then the solution diluted to 25% total solids content.

2 g. alizarine blue 4BX are dissolved in 77 g. of this 25% solution and the dye solution baked for 4 hours at 130° C. and then finely powdered. The pigment is a dark greenish blue and does not bleed in water.

*Example 8.*—a 5 g. of aluminum sulfate are dissolved in 50 cc. of water, heated to 60° C. and, while stirring, there are added 25 cc. of a 10% solution of sodium carbonate. The deposit of aluminum hydroxide is washed by diluting with cold water and decanting the supernatant solution after settling. 20 g. alizarine paste, containing 4 g. alizarine are now added to the aluminum hydroxide base and also 4 g. Turkey red oil added. Then 1.5 g. of calcium chloride are added in form of a 10% solution and also 1 g. of disodium phosphate in the form of a 5% solution. The brown colored suspension is diluted to 300 cc. total volume and boiled for 3 hours in a round flask. 8 g. of dimethylol urea and 2 g. of dimethylol thiourea are now dissolved in 200 cc. water and this solution added to the alizarine suspension, which has pretty well developed to its proper bluish-red color after these 3 hours of boiling. Then it is further boiled for another 3 hours. The deposit is then filtered, well washed and dried at 80° C. over night. (Pigment A.)

b. An alizarine pigment is produced in the exactly same manner as above but omitting the addition of the carbamide-formaldehyde product, and doubling the amount of calcium chloride to 3 g. and the disodium phosphate to 2 g. (Pigment B.)

Rubouts were made with a glue solution from pigments A and B. Pigment A is decidedly more brilliant than pigment B. Both pigments do not bleed, and both pigments possess a splendid light fastness.

*Example 9.*—½ g. of methyl violet 4BX is dissolved in 100 g. varnish I. Then ½ g. tannic acid and ¼ g. of tartar emetic are added, and the mix heat-treated 4 hours at 130° C. By grinding the resultant foamy hard mass, a deep violet pigment is obtained which however bleeds slightly in water. The light fastness of the rubout in glue is decidedly improved in comparison with the soluble dye.

*Example 10.*—0.25 g. rhodamine BX (extra conc.) is dissolved in 200 cc. hot water. 20 g. of powder I (see Ex. 3) are suspended in the dyestuff solution. Then 5 cc. of a solution containing 10% of tannic acid are added and afterwards 5 cc. of a solution of tartar emetic, containing 5% of it added. The mix is stirred well while cooling down from 80° C. to room temperature in the course of ½ hour. The solution is now fairly well exhausted. The deposit is filtered off, washed and dried. (Pigment A.)

A pigment of the same color on alum base is now made by the conventional, known method as follows: 10 g. of alum is dissolved in 100 cc. water and brought to 60° C. 50 cc. of a 10% soda ash solution is stirred into it, and then 150 cc. of a 10% solution of barium chloride added. The deposit is washed once by decantation and then ½ g. rhodamine BX dissolved in 150 cc. of water added. Deposition of the dye is effected by adding 5 cc. of a 10% solution of tannic acid and 5 cc. of a 5% solution of tartar emetic. Then it is filtered, washed and dried. (Pigment B.)

The completed rubouts and light tests of these two pigments show the following results:

The pigment A containing the carbamide-formaldehyde product, is a deep bluish-red of strong shade, whereas the conventional pigment B displays a red which is considerably more on the blue side of a rather weak shade, in spite of the fact that it contains about twice as much dye. Furthermore the light fastness of pigment A is markedly better than the light fastness of the conventional pigment B.

It is obvious that once the invention has been disclosed in its broad aspects, numerous modifications and adaptations falling within the province of the invention, will readily suggest themselves to those skilled in the art. Accordingly, it is intended that the above disclosure is illustrative only and that the invention be limited only by the scope of the appended claims.

I claim:

1. A process for the production of pigment powder insoluble in all common solvents comprising incorporating a coloring matter in a solution of a condensation product of formaldehyde with a member of the group consisting of urea, heat-treated urea, thiourea, guanidine, biuret, guanyl urea and dicyandiamide, subjecting the said condensation product and coloring matter to a heat treatment to insolubilize the former and to affix the coloring matter thereto, and finally reducing the product to the form of a fine powder.

2. A process for the production of pigment powder insoluble in all common solvents comprising dissolving a soluble coloring matter in a solution of a condensation product of formaldehyde with a member of the group consisting of urea, heat-treated urea, thiourea, guanidine, biuret, guanyl urea and dicyandiamide, subjecting same condensation product and coloring matter to a heat treatment to insolubilize the former and to affix the coloring matter thereto, and finally reducing the product to the form of a fine powder.

3. A process for the production of pigment powder insoluble in all common solvents comprising suspending an insoluble coloring matter in a solution of a condensation product of formaldehyde with a member of the group consisting of urea, heat-treated urea, thiourea, guanidine, biuret, guanyl urea and dicyandiamide, subjecting the said condensation product and coloring matter to a heat treatment to insolubilize the former and to affix the coloring matter thereto, and finally reducing the product to the form of a fine powder.

4. A process for the production of pigment powder insoluble in all common solvents comprising incorporating a coloring matter in a solution of a condensation product of formaldehyde with heat-treated urea, subjecting the said condensation product and coloring matter to a heat treatment to insolubilize the former and to affix the coloring matter thereto, and finally reducing the product to the form of a fine powder.

5. A pigment powder, particularly adapted for use in coloring paints, varnishes and the like, which is insoluble in all common solvents and which consists of a heat-treated insolubilized formaldehyde condensation product of a member of the group consisting of urea, heat-treated urea, thiourea, guanidine, biuret, guanyl urea and dicyandiamide, and a coloring matter affixed thereto either by absorption or by envelopment thereby.

6. A pigment powder, particularly adapted for use in coloring paints, varnishes and the like, which is insoluble in all common solvents and which consists of a heat-treated insolubilized formaldehyde condensation product of a member of the group consisting of urea, heat-treated urea, thiourea, guanidine, biuret, guanyl urea and dicyandiamide, and a soluble coloring matter affixed thereto by absorption thereby.

7. A pigment powder, particularly adapted for use in coloring paints, varnishes and the like, which is insoluble in all common solvents and which consists of a heat-treated insolubilized formaldehyde condensation product of a member of the group consisting of urea, heat-treated urea, thiourea, guanidine, biuret, guanyl urea and dicyandiamide, and an insoluble coloring matter affixed thereto by envelopment thereby.

8. A pigment powder, particularly adapted for use in coloring paints, varnishes and the like, which is insoluble in all common solvents and which consists of a heat-treated formaldehyde condensation of heat-treated urea, and coloring matter affixed thereto either by absorption or by envelopment thereby.

GUSTAVE WIDMER.